(12) United States Patent
McCune et al.

(10) Patent No.: US 11,300,321 B2
(45) Date of Patent: Apr. 12, 2022

(54) SYSTEMS AND METHODS TO OPERATE AN HVAC SYSTEM BASED ON SOUND LEVEL

(71) Applicant: Johnson Controls Technology Company, Auburn Hills, MI (US)

(72) Inventors: Tyler P. McCune, El Dorado, KS (US); Shawn A. Hern, Derby, KS (US); Jeremy R. Smith, Park City, KS (US); Aneek M. Noor, Wichita, KS (US); Cody J. Kaiser, Wichita, KS (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 74 days.

(21) Appl. No.: 16/836,701

(22) Filed: Mar. 31, 2020

(65) Prior Publication Data
US 2021/0302063 A1 Sep. 30, 2021

(51) Int. Cl.
| | |
|---|---|
| *F24F 13/24* | (2006.01) |
| *F24F 11/30* | (2018.01) |
| *F24F 11/56* | (2018.01) |
| *F24F 11/64* | (2018.01) |
| *F24F 11/65* | (2018.01) |
| *G05B 15/02* | (2006.01) |
| *F24F 120/20* | (2018.01) |

(52) U.S. Cl.
CPC ............. *F24F 13/24* (2013.01); *F24F 11/30* (2018.01); *F24F 11/56* (2018.01); *F24F 11/64* (2018.01); *F24F 11/65* (2018.01); *G05B 15/02* (2013.01); *F24F 2120/20* (2018.01)

(58) Field of Classification Search
CPC .. F24F 13/24; F24F 11/56; F24F 11/65; F24F 11/64; F24F 11/30; F24F 2120/20; G05B 15/02
See application file for complete search history.

(56) References Cited

U.S. PATENT DOCUMENTS

| | | | |
|---|---|---|---|
| 7,743,617 B2 | 6/2010 | Crane et al. | |
| 7,957,840 B2 * | 6/2011 | Sangenya | F24F 11/30 700/277 |
| 9,618,222 B1 * | 4/2017 | Hussain | G05D 23/1917 |
| 9,841,210 B2 * | 12/2017 | Mehta | F24F 13/24 |
| 10,060,648 B2 | 8/2018 | Kim et al. | |
| 10,386,869 B2 | 8/2019 | Meeuwsen | |
| 10,690,369 B2 * | 6/2020 | Matsuoka | G05B 15/02 |

(Continued)

FOREIGN PATENT DOCUMENTS

CN          104132429 A    11/2014

*Primary Examiner* — Ramesh B Patel
(74) *Attorney, Agent, or Firm* — Fletcher Yoder, P.C.

(57) ABSTRACT

A heating, ventilation, and/or air conditioning (HVAC) system includes a control system, a storage of the control system that stores instructions and a set of operating conditions of the HVAC system, and processor circuitry of the control system. One or more operating conditions of the set of operating conditions is associated with a respective operational sound level, and the processor circuitry is configured to execute the instructions to receive a threshold sound level and operate the HVAC system according to an operating condition of the set of operating conditions based on an operational sound level of the operating condition being less than or equal to the threshold sound level.

24 Claims, 7 Drawing Sheets

(56) References Cited

U.S. PATENT DOCUMENTS

| | | | | |
|---|---|---|---|---|
| 2016/0364978 A1* | 12/2016 | Warren | ............... | H04R 29/001 |
| 2017/0074534 A1* | 3/2017 | Turner | ............... | G05D 23/1917 |
| 2017/0357637 A1* | 12/2017 | Nell | ................... | H04L 12/2823 |
| 2018/0163989 A1 | 6/2018 | Mehta et al. | | |
| 2018/0299163 A1* | 10/2018 | Matsuoka | ................ | F24F 11/62 |
| 2019/0219280 A1* | 7/2019 | Chitrala | ................ | F03D 7/0276 |
| 2019/0356508 A1* | 11/2019 | Trikha | ..................... | E06B 7/28 |
| 2020/0367810 A1* | 11/2020 | Shouldice | .............. | G16H 50/50 |
| 2021/0080141 A1* | 3/2021 | Tsuboi | .................... | F24F 11/63 |

\* cited by examiner

SYSTEMS AND METHODS TO OPERATE AN HVAC SYSTEM BASED ON SOUND LEVEL

BACKGROUND

This section is intended to introduce the reader to various aspects of art that may be related to various aspects of the present disclosure and are described below. This discussion is believed to be helpful in providing the reader with background information to facilitate a better understanding of the various aspects of the present disclosure. Accordingly, it should be noted that these statements are to be read in this light, and not as admissions of prior art.

Heating, ventilation, and/or air conditioning (HVAC) systems are utilized in residential, commercial, and industrial environments to control environmental properties, such as temperature and humidity, for occupants of the respective environments. An HVAC system may control the environmental properties through control of a supply air flow delivered to the environment. For example, the HVAC system may place the supply air flow in a heat exchange relationship with a refrigerant of a vapor compression circuit to condition the supply air flow. The HVAC system may generate sound or noise during operation. In some circumstances, the sound level or amount of noise generated by the operation of the HVAC system, such as a particular operating parameter of a component of the HVAC system, may be undesirable.

SUMMARY

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a heating, ventilation, and/or air conditioning (HVAC) system includes a control system, a storage of the control system that stores instructions and a set of operating conditions of the HVAC system, and processor circuitry of the control system. One or more operating conditions of the set of operating conditions is associated with a respective operational sound level, and the processor circuitry is configured to execute the instructions to receive a threshold sound level and operate the HVAC system according to an operating condition of the set of operating conditions based on an operational sound level of the operating condition being less than or equal to the threshold sound level.

In one embodiment, a non-transitory, computer-readable medium comprising executable instructions that, when executed by a processor, are configured to cause the processor to store a set of operating conditions of the HVAC system, in which one or more operating conditions of the set of operating conditions is associated with a respective operational sound level, receive an indication of a threshold sound level, and select an operating condition of the set of operating conditions of a heating, ventilation, and/or air conditioning (HVAC) system. An operational sound level of the operating condition is less than or equal to the threshold sound level.

In one embodiment, a heating, ventilation, and/or air conditioning (HVAC) system includes processor circuitry and a memory comprising instructions executable by the processor circuitry. When executed, the instructions cause the processor circuitry to access a set of operating conditions of the HVAC system, in which one or more operating conditions of the set of operating conditions is associated with a respective operational sound level, receive an indication of a threshold sound level, select an operating condition of the set of operating conditions based on the operational sound level of the operating condition being less than or equal to the threshold sound level, and operate the HVAC system according to the operating condition.

DRAWINGS

Various aspects of this disclosure may be better understood upon reading the following detailed description and upon reference to the drawings in which.

DETAILED DESCRIPTION

Figure 1:
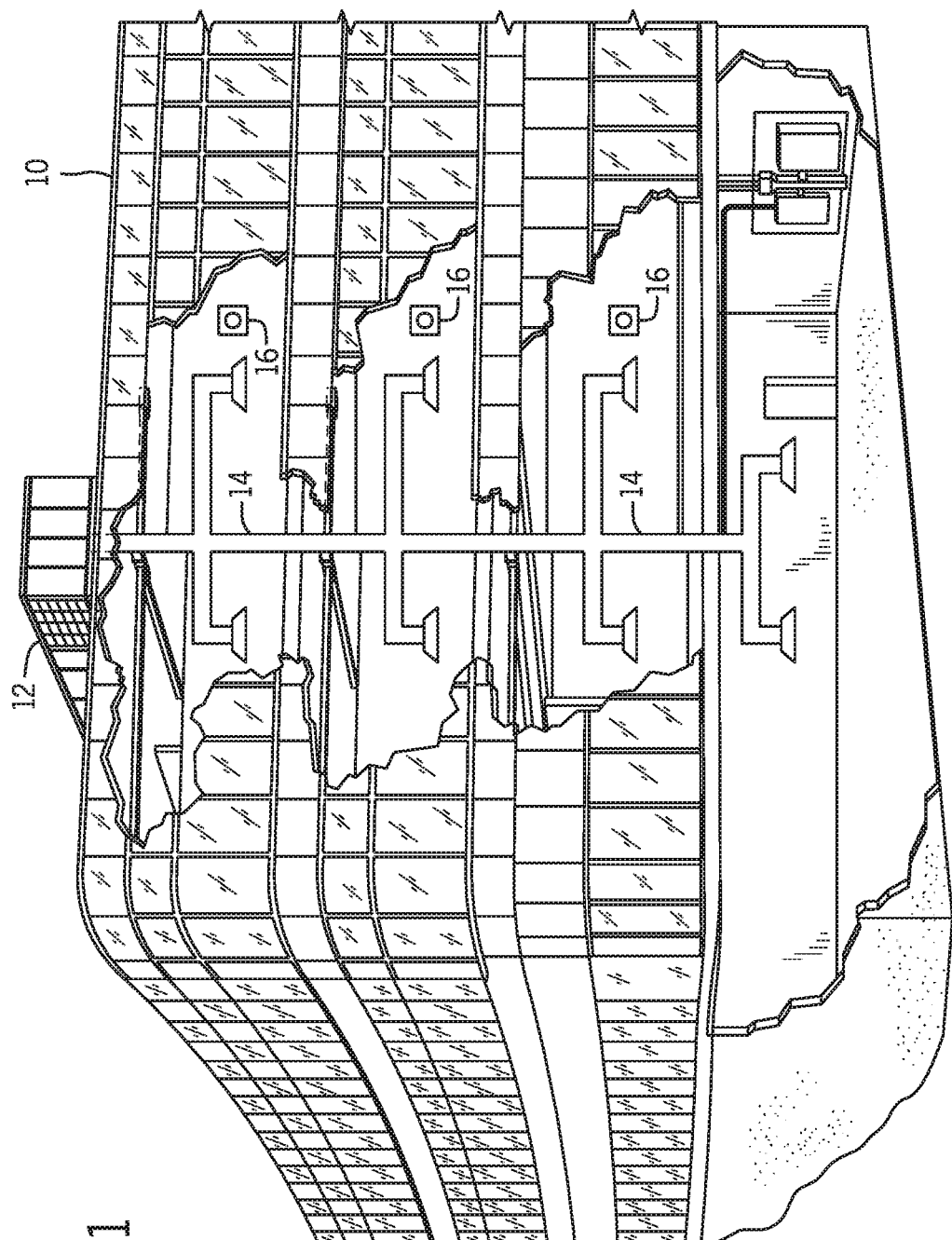
FIG. 1 is a perspective view of an embodiment of a heating, ventilation, and/or air conditioning (HVAC) system for environmental management that may employ one or more HVAC units, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

The present disclosure is directed to a heating, ventilation, and/or air conditioning (HVAC) system configured to condition a structure, such as by conditioning an air flow via a vapor compression system and then delivering the conditioned air flow to the structure. The HVAC system may generate sound during operation. For instance, the HVAC system may include a compressor configured to pressurize a refrigerant flowing through the vapor compression system, and the operation of the compressor may generate sound that is output by the HVAC system.

In some situations, it may be desirable to operate the HVAC system based on a preferred or target sound level, such as by limiting the generated sound level below the preferred sound level. In an example, a first HVAC system may be positioned adjacent to a building, such as a church, in which a high amount of sound is not desirable. Thus, the first HVAC system may be manufactured such that the sound level generated during operation of the HVAC system is equal to or below a threshold level. For instance, the HVAC system may be configured to avoid operation associated with certain operating parameters or operating parameter values, or an operating parameter of a component of the HVAC system may be selected to avoid generated sound levels that are excessive. In another example, the sound produced by a second HVAC system may not be considered in determining the operations of the second HVAC system. As such, the second HVAC system may be manufactured such that the operation of the second HVAC system may generate a sound level above the threshold level. For example, the second HVAC system may operate across a wider range of operating parameters or operating parameter values than that of the first HVAC system. In this way, different HVAC systems may be manufactured based on a desirable or permissible sound level associated with the respective application of the HVAC systems. Unfortunately, it may be difficult to manufacture different embodiments of HVAC systems based on desirable sound levels. For example, it may be tedious to determine the particular threshold sound level that is desirable in a particular application, such as based on a user preference, and then determine how to manufacture and operate the HVAC system based on the threshold sound level. Moreover, a cost associated with manufacturing the HVAC system may increase because multiple different components, such as compressors, may be purchased or manufactured to be readily implemented onto different HVAC systems based on the threshold sound level.

Thus, it is presently recognized that an HVAC system configured to operate in various operating conditions based on a desirable sound level may improve the manufacture and operation of the HVAC system. As used herein, an operating condition refers to different limitations imposed onto the operations of different components of the HVAC system to limit a sound level generated by the HVAC system below a threshold sound level. For instance, the operating condition may include different operating parameters or operating parameter values of the components to be avoided or selected based on the threshold sound level. By way of example, a first operating condition of a compressor may include avoiding operation of the compressor at a first set of frequencies. Moreover, a second operating condition of the compressor may include avoiding operation of the compressor at a second set of frequencies. Embodiments of the present disclosure are directed to an HVAC system that may operate based on a selected operating condition associated with a threshold sound level. The HVAC system may store multiple sets of operating conditions that are each associated with a respective operational sound level and cause the operation of the HVAC system to limit the generated sound to be equal to or below the associated operational sound level. As used herein, the threshold sound level and the operational sound level refers to a value that correlates to a sound level or an intensity of a sound generated by the HVAC system. In an example, for an operating condition associated with an operational sound level, the components of the HVAC system may operate according to a set of operating parameters and/or modes that limit the generated sound level to be equal to or below the operational sound level. Additionally, each of the operating conditions may be selectable or modifiable, such as by a user or operator of the HVAC system, after installation of the HVAC system to configure the operation of the HVAC system based on a threshold sound level. For this reason, a single embodiment of the HVAC system may be manufactured and installed, and the particular operation of the HVAC system may be set or adjusted accordingly after installation based on a desirable or preferable threshold sound level. Moreover, although this disclosure primarily discusses using the operating conditions to control the sound level generated by the HVAC system, similar techniques may be used in regards to a vibration, a temperature, or any other suitable criteria associated with the HVAC system.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
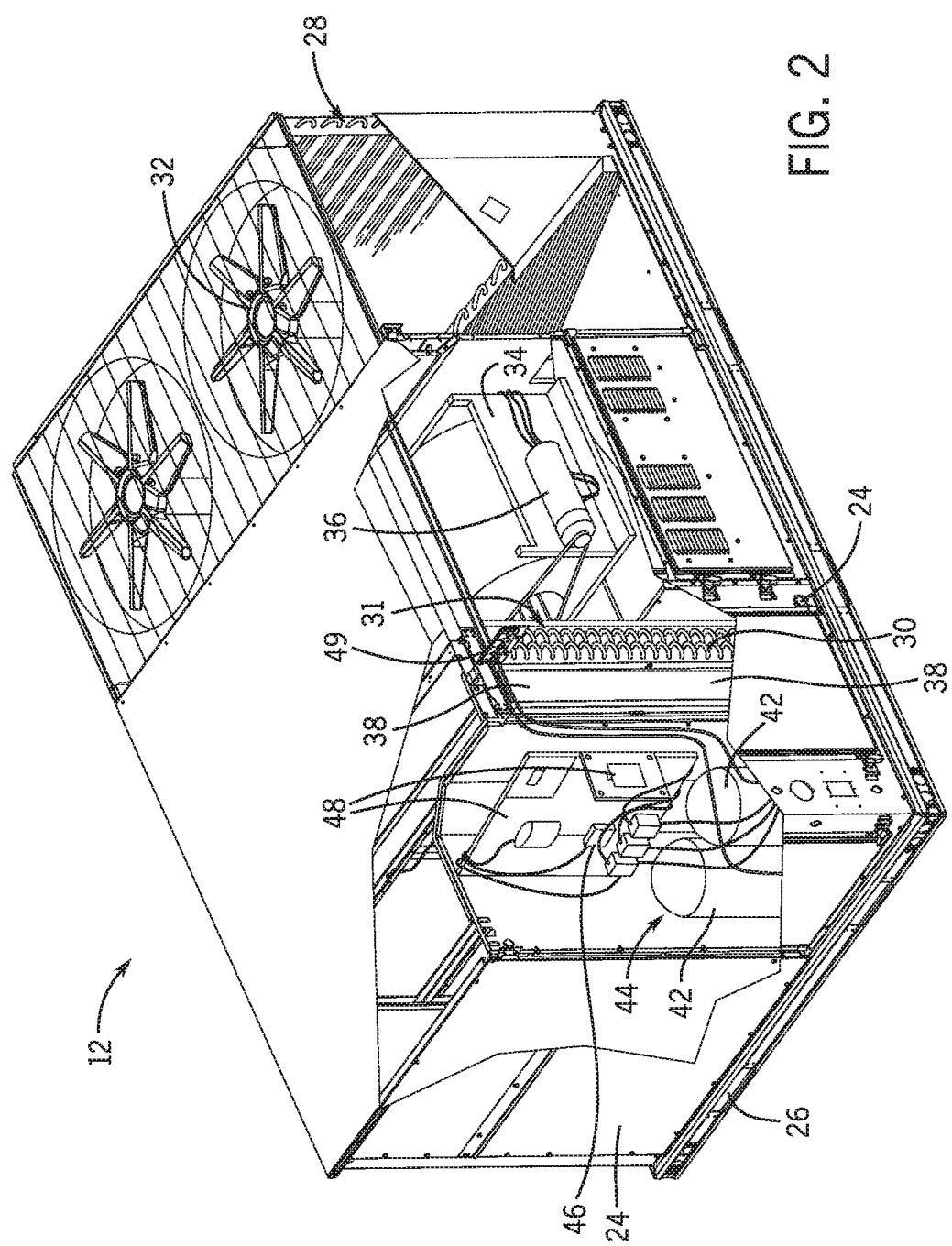
FIG. 2 is a perspective view of an embodiment of a packaged HVAC unit that may be used in the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit onto "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. Additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
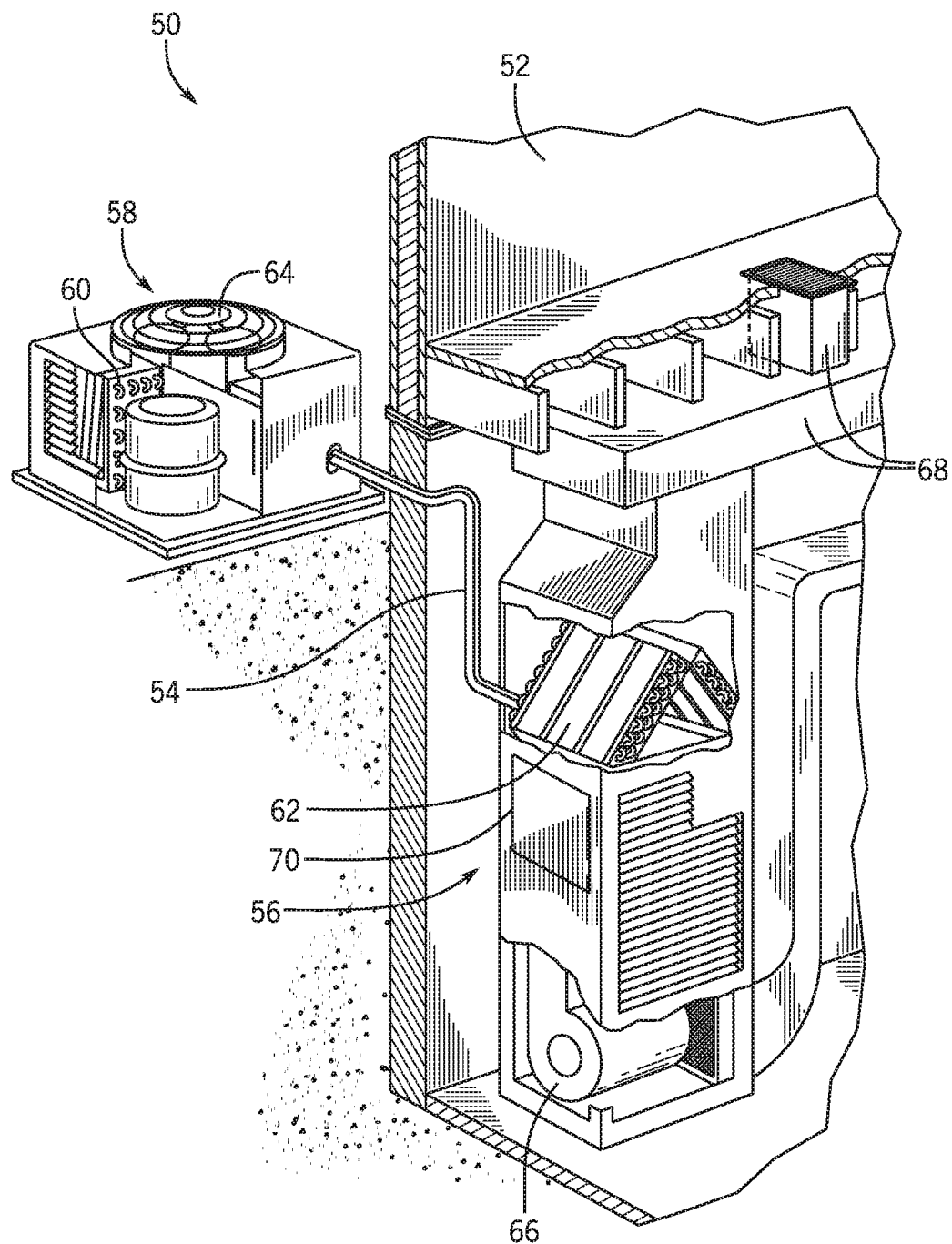
FIG. 3 is a cutaway perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
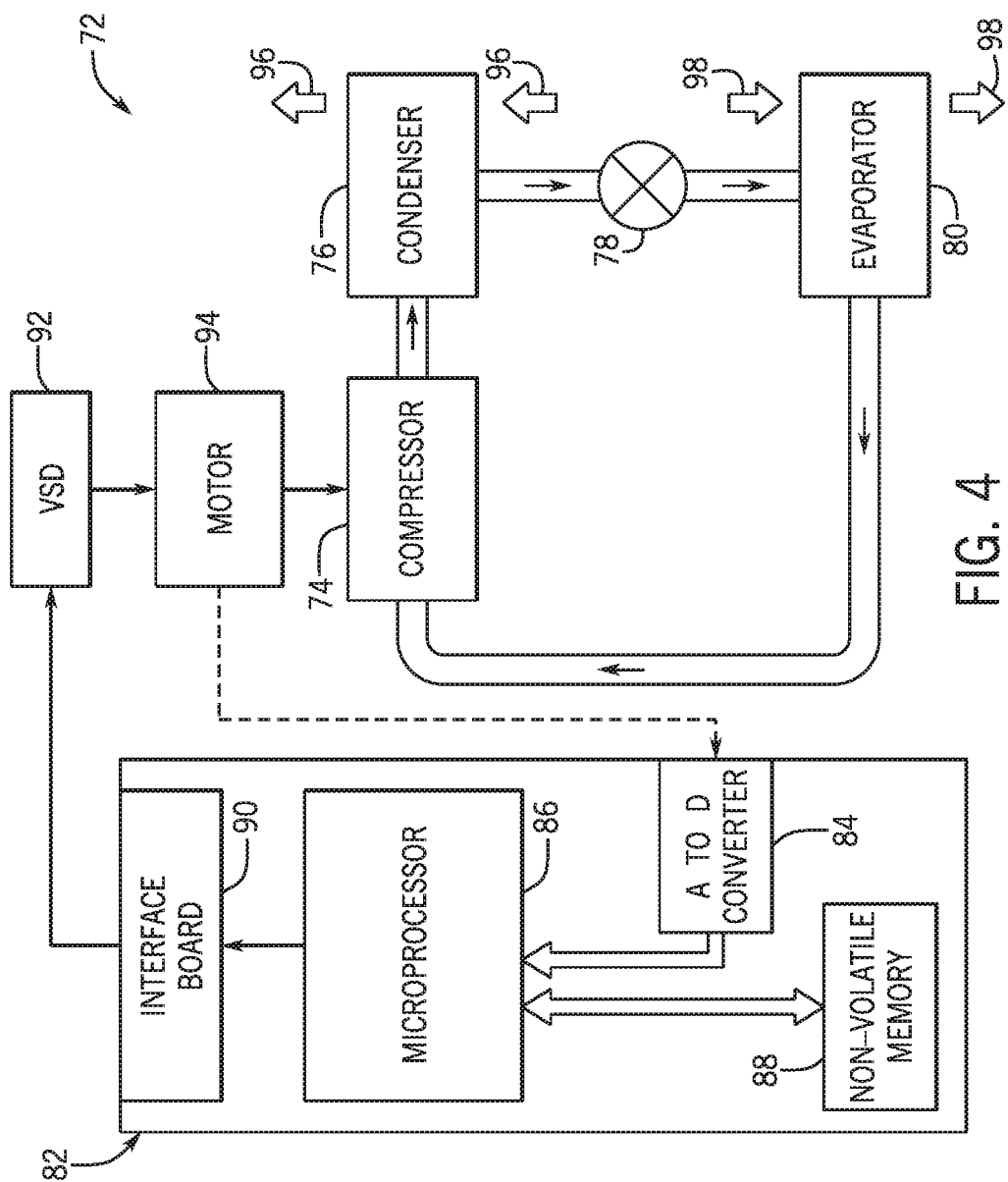
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

Any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The present disclosure is directed to an HVAC system configured to operate and condition an air flow in accordance to various operating conditions. Each of the operating conditions may be selectable based on a selection indicative of a threshold sound level, and each operating condition may be associated with particular operating parameters and/or modes of a component of the HVAC system. For instance, different operations, such as operating parameters, of the compressor may be enabled based on the selected operating condition. In one example, for a first operating condition, the compressor may be blocked from operating at a first set of frequencies to limit the generated sound level to be equal to or below the first threshold sound level. For a second operating condition associated with a second threshold sound level that is less than the first threshold level, the compressor may be blocked from operating at the first set of frequencies and at a second set of frequencies, to further limit the generated sound level to be equal to or below the lower second threshold sound level. Alternatively, if the second threshold sound level is acceptable, the compressor may be blocked from operating at the first set of frequencies and enabled to operate at the second set of frequencies.

In some embodiments, the different operating parameters and/or modes may be associated with different efficiencies at which the HVAC system may condition the air flow. As an example, although the compressor may generate more sound when the first operating condition is implemented as compared to that in the second operating condition, the operation of the compressor during the first operating condition may be more efficient than the operation of the compressor during the second operating condition, because the compressor may operate in a greater number of frequencies. Therefore, the selected operating condition may be based on a desirable performance of the HVAC system in addition to the desirable sound level generated by the HVAC system.

Figure 5:
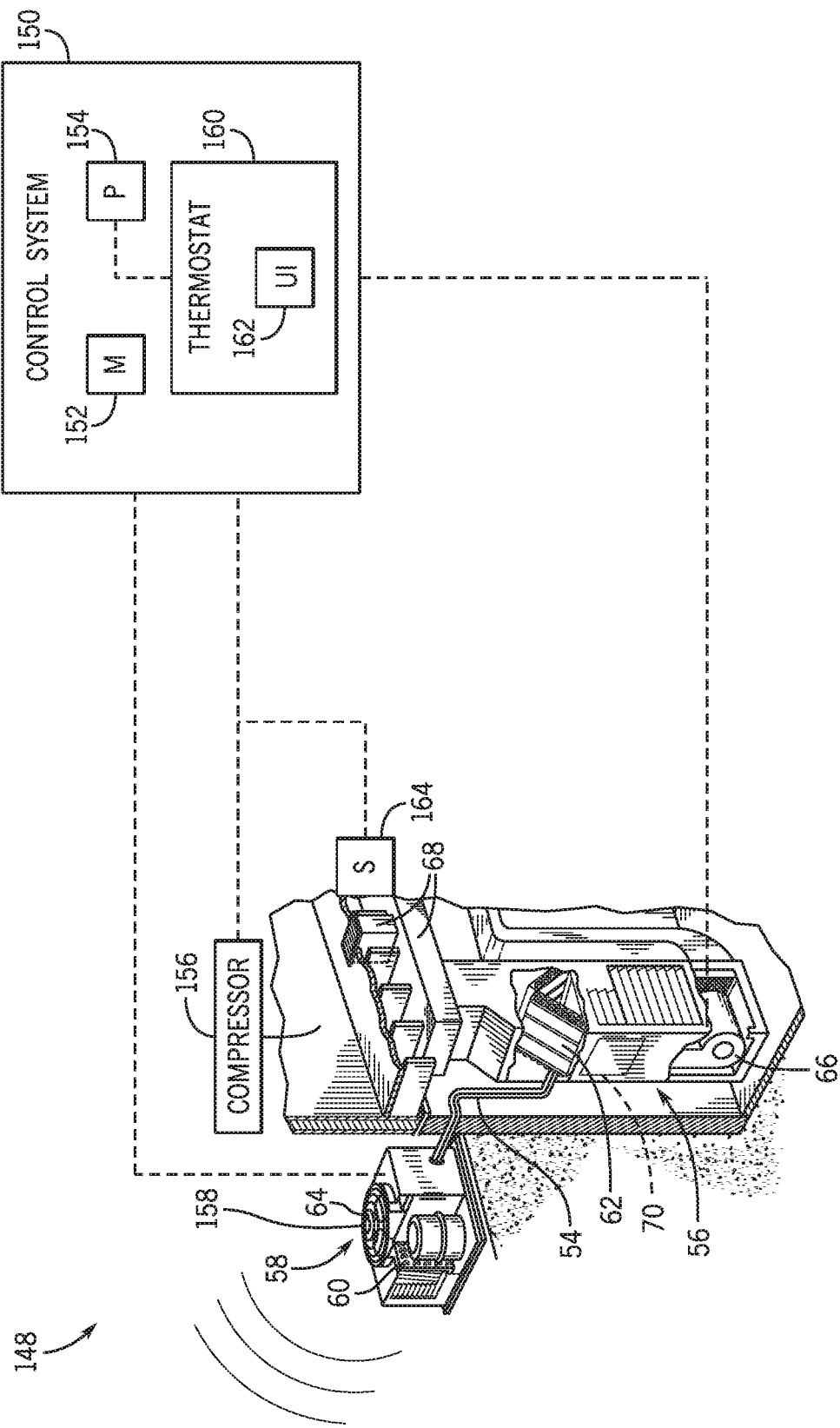
FIG. 5 is a schematic diagram of an embodiment of an HVAC system configured to condition an air flow, in accordance with an aspect of the present disclosure.

With this in mind, FIG. 5 is a schematic diagram of an HVAC system 148 configured to condition an air flow. The HVAC system 148 may include or be communicatively coupled to a control system 150 configured to control operation of certain components of the HVAC system 148. Although the illustrated control system 150 is configured to control operation of the residential heating and cooling system 50, the control system 150 may additionally or alternatively control operation of any suitable HVAC system, such as the packaged HVAC unit 12. The control system 150 may be similar to the control board 82 of FIG. 4 and may include a memory 152 and processor circuitry 154, such as a microprocessor. The memory 152 may include volatile memory, such as random-access memory (RAM), and/or non-volatile memory, such as read-only memory (ROM), optical drives, hard disc drives, solid-state drives, or any other non-transitory computer-readable medium that includes instructions to operate the HVAC system 148. In certain embodiments, the memory 152 may include multiple memories. For instance, the memory 152 may include a first memory, such as a physical memory of the control system 150, that stores the instructions to operate the HVAC system 148, and the memory 152 may also include a second, separate memory of the HVAC system 148, such as cloud storage, storing various operating conditions in which the HVAC system 148 operates. Accordingly, the first memory and the second memory may be communicatively coupled to one another. The processor circuitry 154 may be configured to execute instructions stored on the memory 152 to control operation of various components of the HVAC system 148. For example, the processor circuitry 154 may include one or more application specific integrated circuits (ASICs), one or more field programmable gate arrays (FPGAs), one or more general purpose processors, or any combination thereof, to operate the HVAC system 148, such as by accessing and selecting one of the operating conditions.

In some embodiments, the control system 150 is configured to control the operation of a compressor 156 of the HVAC system 148 to pressurize the refrigerant used for conditioning the air flow. The compressor 156 may be a variable frequency or a variable speed compressor in which different operations of the compressor 156 may have different operating parameters, operating parameter values, speeds, or stages that may change the extent to which the refrigerant is pressurized, thereby changing the conditioning of the air flow. For instance, a first operation of the compressor 156 may have a first operating parameter value to condition the air flow to a first temperature, and a second operation of the compressor 156 may have a second operating parameter value to condition the air flow to a second temperature. For this reason, the operation of the compressor 156 may be based on a desirable condition of the air flow, such as based on a difference between a current condition, such as a current temperature, and a target condition, such as a target temperature, of the air flow. The control system 150 may adjust the operating conditions of the compressor 156 to adjust or achieve other conditions, such as a target temperature of refrigerant exiting the compressor 156, a target pressure of refrigerant exiting the compressor 156, as target superheat of the refrigerant, and so forth.

Similarly, in additional or alternative embodiments, the control system 150 is configured to set the operation of a condenser 158 to achieve a desired level of cooling of the refrigerant. The condenser 158 may include a variable speed fan that may operate at various speeds or operating parameter values to adjust the amount of refrigerant cooling achieved by the condenser 158 in order to change the conditioning of the air flow. Thus, the control system 150 may also change the operation of the condenser 158 based on the desirable condition of the air flow and/or based on other parameters. In further embodiments, the control system 150 may be configured to set the operation of other suitable components of the HVAC system 148, such as a blower, a furnace system, and so forth, based on the desirable condition of the air flow and/or based on other target parameters.

In certain embodiments, the HVAC system 148 may condition the air flow based on a user input. By way of example, a user of the HVAC system 148, such as an operator of the HVAC system 148, a person associated with the structure serviced by the HVAC system 148, and the like, may select an operating parameter. The operating parameter may include a target temperature of a structure serviced by the HVAC system 148, a target humidity of the structure serviced by the HVAC system 148, and the like. To this end, the control system 150 may include a thermostat 160 with which the user may interact to indicate and input the operating parameter. For example, the thermostat 160 may include a user interface 162, such as a touchscreen, a knob, a slider, a button, a trackpad, a switch, and so forth, that may be utilized to change or set the operating parameter. The user interface 162 may be communicatively coupled to the processor circuitry 154 to enable the processor circuitry 154 to receive the user input from the user interface 162 and to execute the instructions stored in the memory 152 based on the user input.

As mentioned above, different operations of the compressor 156 and the condenser 158 may generate different sound or noise levels. For example, the compressor 156 may operate at a first operating parameter value (e.g., a first frequency) to cause the HVAC system 148 to generate and output a first sound level, and the compressor 156 may operate at a second operating parameter value (e.g., a second frequency) to cause the HVAC system 148 to generate and output a second sound level that is greater or louder than the first sound level. Moreover, it may be desirable to limit the sound level output by the HVAC system 148, such as by limiting the operating parameter values at which compressor 156 and/or the condenser 158 may be operated. For instance, it may be desirable to limit the HVAC system 148 to output a sound level that is below the second sound level and therefore, the control system 150 may not operate the compressor 156 at the second operating parameter value. However, the control system 150 may still operate the compressor 156 at the first operating parameter value if it is permissible for the sound level output by the HVAC system 148 to be greater than the first sound level. In other words, the control system 150 may change the available operating parameter values at which various components of the HVAC system 148 may operate based on the desirable sound level output by the HVAC system 148.

The control system 150 may store various sets of operating conditions in the memory 152. Each operating condition may be associated with an operational sound level indicative of a sound level limit below or at which it is desirable for the operation of the HVAC system 148 to generate. As an example, for a first operating condition associated with a first operational sound level that is between the first sound level and the second sound level discussed above, the control system 150 may block the compressor 156 from operating at the second operating parameter value but may enable the compressor 156 to operate at the first operating parameter value. For a second operating condition indicative of a second operational sound level that is below the first sound level and the second sound level, the control system 150 may block the compressor 156 from operating at either the first operating parameter value or the second operating parameter value. For a third operating condition indicative of a third operational sound level that is above the first sound level and the second sound level, the control system 150 may enable the compressor 156 to operate at either the first operating parameter value or the second operating parameter value. Accordingly, the control system 150 may enable the components of the HVAC system 148 to operate at various operating parameter values based on a selected operating condition. In certain embodiments, the operating parameter values and the operation of the HVAC system 148 associated with each operating condition may be predetermined prior to installation of the HVAC system 148. For example, testing may be performed on the HVAC system 148 prior to installation to determine the particular available operating parameter values of the components of the HVAC system 148 for each operating condition. In this way, a single embodiment of the HVAC system 148 may readily operate in various operating conditions upon installation.

In some implementations, the operating condition is also selectable by a user. In an example, the user may utilize the user interface 162 to select the desirable operating condition for the HVAC system 148. The control system 150 may then control the operation of the HVAC system 148 accordingly based on the selected operating condition. By way of example, in some embodiments, the HVAC system 148 may initially operate in accordance with a default operating condition after the HVAC system 148 is installed. At a time after installation of the HVAC system 148, the user may use the thermostat 160 to select a different operating condition such that the HVAC system 148 no longer operates in accordance with the default operating condition. Indeed, the user may select an operating condition at any time after the HVAC system 148 is installed, and the control system 150 may operate the HVAC system 148 accordingly.

In some embodiments, the HVAC system 148 may also include a sensor 164 that may be configured to determine an operating parameter or operating parameter value associated with the HVAC system 148. The sensor 164 may be communicatively coupled to the control system 150, such as to the processor circuitry 154, and the control system 150 may operate the HVAC system 148 based on sensor data received from the sensor 164. As an example, the sensor 164 may be configured to determine a time of operation of the HVAC system 148, a time of day, a condition of the structure serviced by the HVAC system 148, a condition of the air flow conditioned by the HVAC system 148, a condition of a component of the HVAC system 148, and the like. In an example, the control system 150 may operate the HVAC system 148 under different operating conditions based on time, such as with reference to a schedule set by the user. By way of example, the control system 150 may operate the HVAC system 148 according to a first operating condition during a first scheduled time period, such as a first block of time of a day, and according to a second operating condition during a second scheduled time period, such as a second block of time in the same day, that is different from the first scheduled time period. Thus, the HVAC system 148 may use the sensor data to determine which operating condition is to be utilized based on a current time.

In additional or alternative embodiments, the sensor 164 may be configured to monitor the sound level output by the HVAC system 148. The control system 150 may then use the sensor data to adjust the operation of the HVAC system 148, such as the operating parameters or operating parameter values associated with the operating conditions. By way of example, testing of the HVAC system 148 prior to installation may enable association of an initial set of operating parameter values of the compressor 156 with one or more operational sound levels. However, after the HVAC system 148 has been installed, it may be determined that the initial set of operating parameter values of the compressor 156 in the particular installation of the HVAC system 148 cause the HVAC system 148 to operate above or below one or more of the operational sound levels. For instance, after installation, it may be determined that a particular operating frequency of the compressor 156 initially included in the initial set of operating parameter values may cause the HVAC system 148 to output a sound level that is above the operational sound level, as monitored by the sensor 164. As a result, the control system 150 may adjust the specific operating condition by blocking the compressor 156 from operating at the particular operating frequency after installation of the HVAC system 148, even though the particular operating parameter value was allowed prior to installation of the HVAC system 148.

Figure 6:
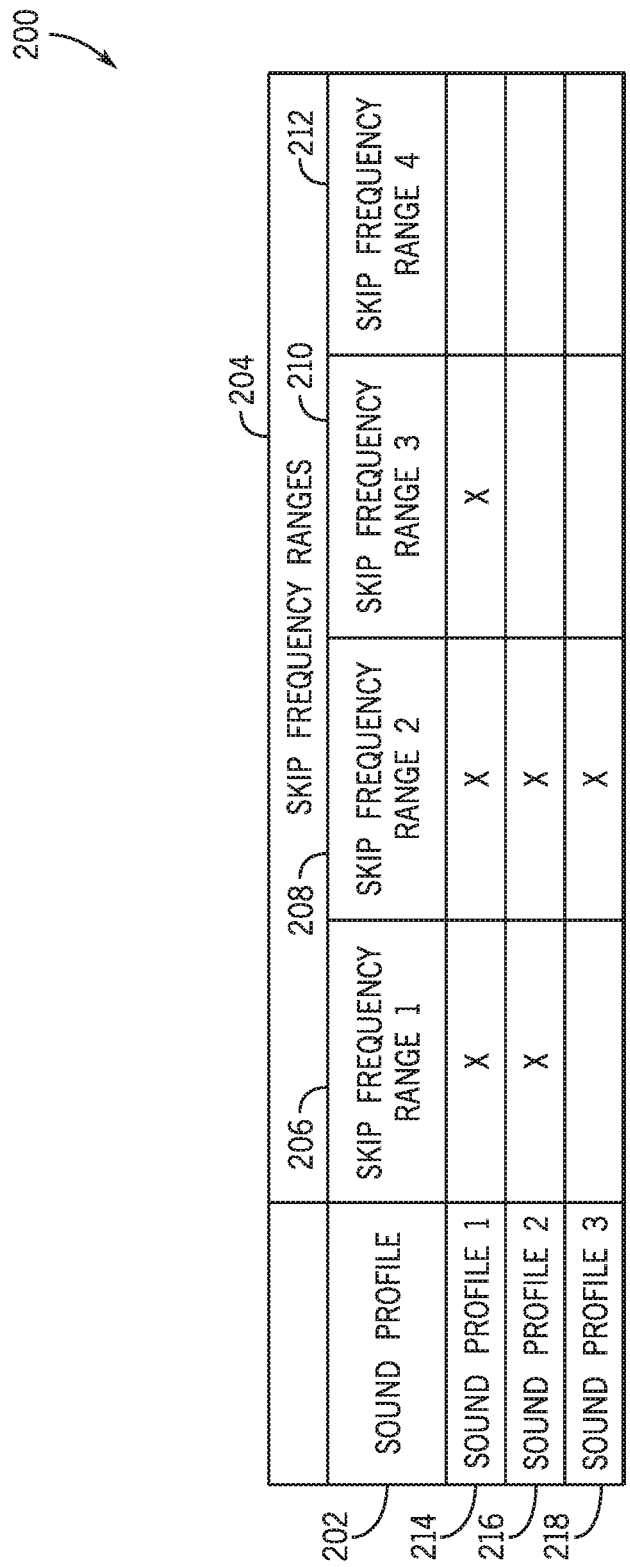
FIG. 6 is an embodiment of a table illustrating operating conditions in which an HVAC system may operate, in accordance with an aspect of the present disclosure.

FIG. 6 is an embodiment of a table 200 illustrating a set of operating conditions that are each associated with a selectable sound profile of the HVAC system 148. As discussed in detail below, the table 200 shows various frequency ranges of the compressor 156 at which the HVAC system 148 will not operate the compressor 156 based on the selection of a sound profile. For example, each sound profile may be associated with a corresponding operational sound level, and frequency ranges of the compressor 156 that produce a respective individual sound level greater than the operational sound level may be associated with the respective sound profile.

In certain embodiments, the table 200 may be a database table that is stored in the memory 152 and/or that is otherwise accessible by the control system 150, such as by the processor circuitry 154 of the control system 150, and the control system 150 may reference the database table to enable or block use of certain operating parameter values with the components of the HVAC system 148. As shown in FIG. 6, the table 200 includes a sound profile field 202 for defining various selectable sound profiles according to which the HVAC system 148 may operate. Each sound profile of the HVAC system 148 is associated with a particular operating condition of the HVAC system 148, and each operating condition includes a set of operating parameter values for the compressor 156. More specifically, the illustrated table 200 includes a skip frequency range field 204 and therefore, each sound profile may include operating parameter values that are not utilized to operate the compressor 156. In other words, each operating condition defines a subset of excluded compressor operating frequencies at which the compressor 156 may operate. To this end, the control system 150 may block the compressor 156 from operating at a frequency that is included within a particular skip frequency range as indicated by the table 200. In the illustrated embodiment, the skip frequency range field 204 includes a first skip frequency range 206, a second skip frequency range 208, a third skip frequency range 210, and a fourth skip frequency range 212, but additional or alternative skip frequency range fields 204 may include any suitable number of skip frequency ranges.

For instance, first frequencies associated with the first skip frequency range 206 may cause the HVAC system 148 to output a greater sound level than that output by the third and fourth frequencies associated with the third and fourth skip frequency ranges 210, 212, respectively. Also, the third frequencies associated with the third skip frequency range 210 may cause the HVAC system 148 to output a greater sound level than that output by the fourth frequencies associated with the fourth skip frequency range 212. Moreover, the table 200 may include a first sound profile 214, a second sound profile 216, and a third sound profile 218. Although the illustrated table 200 includes three sound profiles, additional or alternative tables may include any suitable number of sound profiles, such as one sound profile, two sound profiles, or four or more sound profiles.

Each sound profile may be associated with a respective operational sound level, and certain of the skip frequency ranges 206, 208, 210, 212 may be associated with each sound profile based on the sound output of the various skip frequency ranges 206, 208, 210, 212 and the operational sound level of the sound profile. For example, in the illustrated embodiment, the first sound profile 214 may have a first operational sound level, and operating the compressor 156 at a frequency within the first, second, or third skip frequency ranges 206, 208, and 210 may cause the compressor 156 to output a sound level that is greater than the first operational sound level. Accordingly, the first, second, and third skip frequency ranges 206, 208, and 210 are associated with the first sound profile 214. If the first sound profile 214 is selected, the control system 150 may control operation of the compressor 156 so that the compressor 156 does not operate at a frequency that is within any of the first, second, and third skip frequency ranges 206, 208, and 210. Thus, certain operations may be excluded based on the selection of a sound profile to avoid generating sound greater than the operational sound level associated with the selected sound profile. As such, a greater or louder operational sound level may enable the compressor 156 to operate in a greater quantity of operating parameter values, which include compressor frequencies in the illustrated embodiment.

The first sound profile 214 may be associated with a first operational sound level that is lower than a second operational sound level associated with the second sound profile 216, and the second operational sound level may be lower than a third operational sound level associated with the third sound profile 218. Accordingly, fewer compressor frequencies or frequency ranges may be skipped when the compressor 156 is operated according to the third sound profile 218 than when the compressor 156 is operated according to the first and second sound profiles 214, 216. Similarly, fewer compressor frequencies or frequency ranges may be skipped when the compressor 156 is operated according to the third sound profile 218 than when the compressor 156 is operated according to the first or second sound profile 214, 216.

As an example, the first sound profile 214 is associated with the first skip frequency range 206, the second skip frequency range 208, and the third skip frequency range 210, thereby defining excluded frequency ranges associated with the first, second, and third skip frequency ranges 206, 208, 210 from use when operating the compressor 156 according to the first sound profile 214. As such, with the first sound profile 214 selected, the control system 150 blocks or excludes the compressor 156 from operating at frequencies that are within or associated with the first, second, and third skip frequency ranges 206, 208, 210. However, the first sound profile 214 is not associated with the fourth skip frequency range 212, and the control system 150 may therefore enable the compressor 156 to operate at a frequency that is within or associated with the fourth skip frequency range 212.

Moreover, the second sound profile 216 is associated with the first skip frequency range 206 and the second skip frequency range 208. Thus, with the second sound profile 216 selected, the control system 150 may block the compressor 156 from operating at frequencies within or associated with the first skip frequency range 206 or the second skip frequency range 208. However, the control system 150 may enable the compressor 156 to operate at a frequency that is within or associated with the third skip frequency range 210 or the fourth skip frequency range 212. In addition, the third sound profile 218 is associated with the second skip frequency range 208. Thus, with the third sound profile 218 selected, the control system 150 may enable the compressor 156 to operate at a frequency that is within or associated with any of the first skip frequency range 206, the third skip frequency range 210, and the fourth skip frequency range 212, but not a frequency associated with the second skip frequency range 208.

It should be noted that in the illustrated embodiment, each of the sound profiles 214, 216, 218 is associated with the second skip frequency range 208. That is, for each of the sound profiles 214, 216, 218, the control system 150 may block the compressor 156 from operating at a frequency within or associated with the second skip frequency range 208. As an example, the second skip frequency range 208 may be associated with particular operating parameter values of the compressor, such as a resonant frequency, that affects the performance of the HVAC system 148, such as by reducing the efficiency of the HVAC system 148 to condition the air flow and/or affecting a structural integrity of the HVAC system 148. For this reason, the control system 150 may block the compressor 156 from operating at a frequency within or associated with the second skip frequency range 208 regardless of the selected sound profile.

In addition, any of the sound profiles 214, 216, 218 may be dynamically adjustable. For instance, the illustrated table 200 may be a default table 200 produced via testing of the HVAC system 148 and that is applied and/or stored on a memory (e.g., the memory 152) of the HVAC system 148 upon installation of the HVAC system 148 such that, initially, only the second skip frequency range 208 is associated with the third sound profile 218 to cause the HVAC system 148 to output a sound level below the operational sound level associated with the third sound profile 218. However, upon installation of the HVAC system 148, it may be determined, such as based on sensor data transmitted by the sensor 164 and indicative of a current sound level, that operating the compressor 156 at a frequency within or associated with the first skip frequency range 206 causes the HVAC system 148 to output sound that is above the operational sound level associated with the third sound profile 218. For this reason, the control system 150 may adjust the third sound profile 218 after installation of the HVAC system 148 such that the third sound profile 218 is also associated with additional skip frequency ranges, such as the first skip frequency range 206, to limit the generated sound to be at or below the operational sound level associated with the third sound profile 218.

Furthermore, the illustrated table 200 associates sound profiles 214, 216, 218 with compressor frequencies and frequency ranges. However, additional or alternative embodiments of the table 200 may associate sound profiles 214, 216, 218 with other operating parameters and operating parameter values. In an example, the operating parameters may include compressor operating speeds and/or stages, and various ranges or subsets of excluded compressor operating speeds and/or stages may be defined, including a correlation with sound output levels, and may be associated with the various sound profiles 214, 216, 218 based on the respective operational sound level associated with each sound profile 214, 216, 218. In another example, the operating parameter may include outdoor fan speeds, and various ranges or subsets of excluded outdoor fan speed values may be defined, including a correlation with sound output levels, and may be associated with the various sound profiles 214, 216, 218 based on the respective operational sound level associated with each sound profile 214, 216, 218. In any case, the excluded operating parameter ranges or values may be associated with any suitable sound profile 214, 216, 218 in order to block or exclude certain operations of a component of the HVAC system 148 that cause the HVAC system 148 to output a sound level that is equal to or greater than the operational sound level of a particular sound profile. Thus, each operating parameter value enabled by the sound profiles 214, 216, 218 may be associated with a respective individual operational sound level. The sound profile 214, 216, 218 may be selected based on each respective individual operational sound level of the selected sound profile 214, 216, 218 being less than or equal to a desirable threshold sound level.

Further embodiments of the table 200 may associate different sound profiles with the operation of multiple components of the HVAC system 148. For instance, the first sound profile 214 may be associated with a combination of particular operating parameters of the compressor 156 and particular operating parameters of the condenser 158. In an example, for one of the sound profiles 214, 216, 218, the first skip frequency range 206 of the compressor 156 may apply when the fan of the condenser 158 is operating within a first speed range, but the first skip frequency range 206 of the compressor 156 may not apply when the fan of the condenser 158 is operating within a second speed range. In such embodiments, the combination of operating parameters associated with each sound profile 214, 216, 218 may be based on a cumulative or total operational sound level output by the HVAC system 148. Indeed, the table 200 may factor in different operating parameters and parameter values of multiple components to determine how each component of the HVAC system 148 may be operated based on an associated operational sound level and/or how the sound output of each component at various operating parameter values impacts the total sound output of the HVAC system 148. Moreover, each cumulative operational sound level may be equal to or below a selected threshold sound level. In other words, each sound profile 214, 216, 218 may be associated with a cumulative operational sound level not to be exceeded by the operation of multiple components of the HVAC system 148 at respective operating parameters values.

Figure 7:
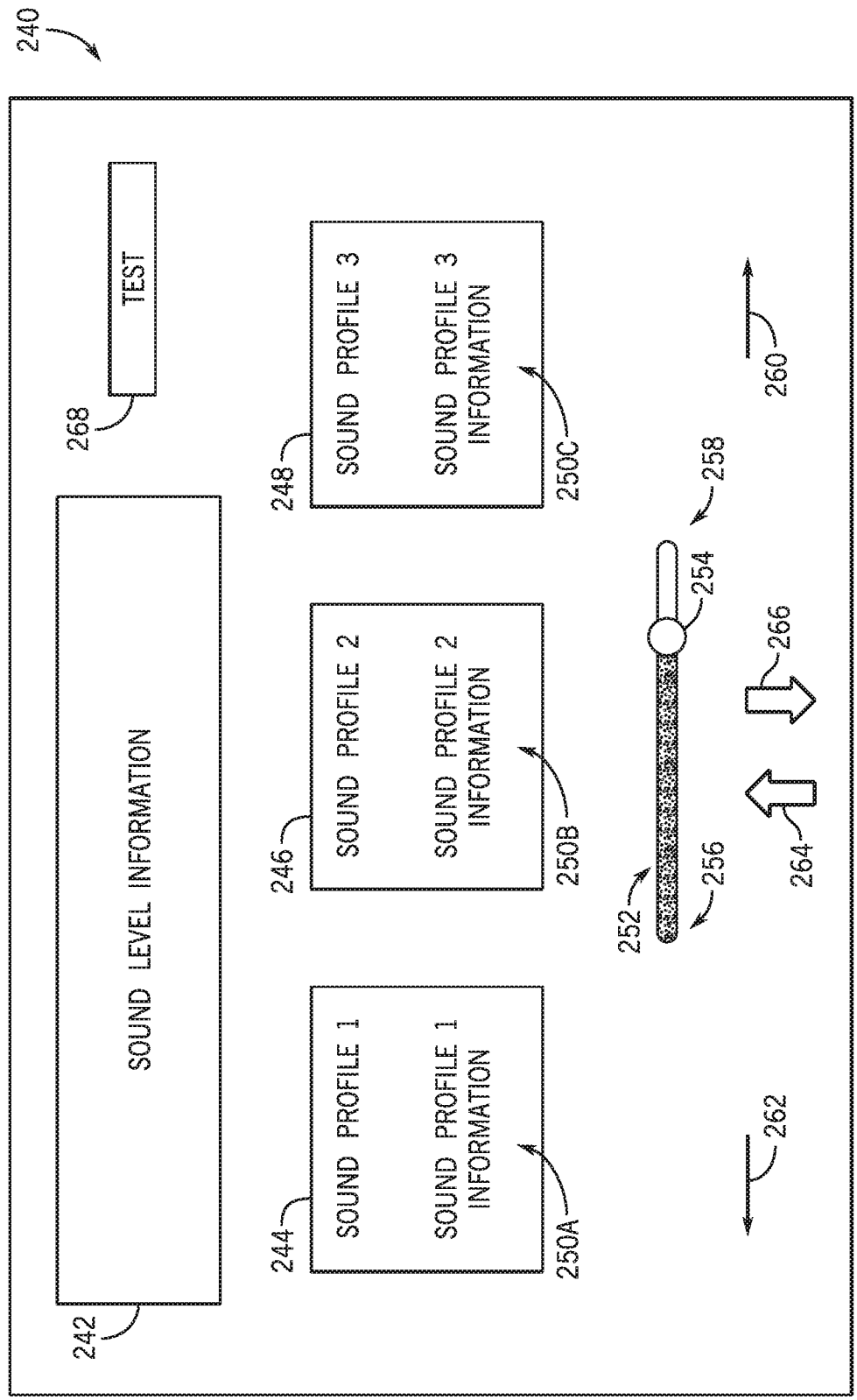
FIG. 7 is a schematic diagram of an embodiment of a user interface that may be used for selecting an operating condition of an HVAC system, in accordance with an aspect of the present disclosure.

FIG. 7 is schematic diagram of an embodiment of a user interface 240 that may be used for selecting the operating condition of the HVAC system 148. The user interface 240 may be a part of the user interface 162 of the thermostat 160 as described in FIG. 5. The user interface 240 may include a display 242 configured to present information regarding the sound level and profiles of the HVAC system 148. The information may include a current sound level output by the HVAC system 148, an operational sound level associated with the operating condition currently selected, general sound level information, such as an analogous sound associated with various sound levels, historical sound level information associated with the HVAC system 148, sound output levels of individual components of the HVAC system 148, other suitable sound level information, or any combination thereof.

The user interface 240 may further include various icons that are selectable by the user to indicate a selected threshold sound level. For example, the user interface 140 may be a touchscreen. Such icons may include a first sound profile icon 244 associated with a first sound profile, such as the first sound profile 214, a second sound profile icon 246 associated with a second sound profile, such as the second sound profile 216, and a third sound profile icon 248 associated with a third sound profile, such as the third sound profile 218. An alternative user interface 240 may have any suitable number of icons based on the number of available sound profiles associated with the HVAC system 148. Respective sound profile information 250 may also be presented with each sound profile icon 244, 246, 248. For instance, first sound profile information 250A associated with the first sound profile is presented with the first sound profile icon 244, second sound profile information 250B associated with the second sound profile is presented with the second sound profile icon 246, and third sound profile information 250C associated with the third sound profile is presented with the third sound profile icon 248. Each sound profile information 250 may include details such as the operational sound level associated with the respective sound profile, permissible operating conditions, parameters, or parameter value, usage history, users of the HVAC system 148, a schedule, and the like, associated with the sound profile of the corresponding sound profile icon 244, 246, 248. Additionally, each sound profile icon 244, 246, 248 may be selectable by the user to cause the HVAC system 148 to operate according to the selected sound profile. Accordingly, upon selection (e.g., user selection) of one of the sound profile icons 244, 246, 248, the control system 150 may cause components of the HVAC system 148 to operate according to the operation parameters enabled by the sound profile that is associated with the selected sound profile icon 244, 246, 248.

In certain embodiments, if a component of the HVAC system 148 is currently operating in accordance with an initially-selected sound profile, upon selection of a new sound profile, the control system 150 may immediately change operation of the component and/or immediately apply operation restrictions associated with the new operating condition. For example, the HVAC system 148 may initially operate in accordance with the third sound profile 218 described in FIG. 6, and the compressor 156 may be operating at a first frequency that is included in the first skip frequency range 206, as enabled by the third sound profile 218. However, the control system 150 may receive an indication to operate in accordance with the first sound profile 214, which is associated with the first skip frequency range 206 that blocks the compressor 156 from operating at the first frequency. Therefore, the control system 150 may change the operation of the compressor 156 to operate at a second frequency that is not blocked by the first sound profile 214.

The user interface 240 may also display or include a slider 252 that can be used for selecting a threshold sound level, such as within a range of selectable sound levels. For example, the slider 252 may be used to select a threshold sound level associated with a particular operating condition. For instance, the slider 252 includes a marker 254 that is movable between a first end 256, which indicates a low threshold sound level, and a second end 258, which indicates a high threshold sound level. In this way, moving the marker 254 in a first direction 260 may increase the selected threshold sound level, and moving the marker 254 in a second direction 262 may reduce the selected threshold sound level. Indeed, the marker 254 may be set in any suitable position between the first end 256 and the second end 258 to select a particular threshold sound level between the low threshold sound level and the high threshold sound level, and the control system 150 may operate the HVAC system 148 accordingly based on the selected threshold sound level indicated by the position of the marker 254. Although the illustrated marker 254 is configured to move in linear directions, additional or alternative markers 254 may be moved in any suitable manner, such as along a curved path, to select a particular threshold sound level. In any case, the user interface 240 may receive a user input indicative of a selected threshold sound level via the slider 252, and the control system 150 may associate the selected threshold sound level with an operating condition and/or operate the HVAC system 148 according to the selected threshold sound level.

The user interface 240 may additionally or alternatively include other icons that are selectable and/or maneuverable to adjust a threshold sound level. The illustrated user interface 240 includes an up arrow icon 264, which may be selected to increase the selected threshold sound level, and a down arrow icon 266, which may be selected to reduce the selected threshold sound level. For example, selection of the up arrow icon 264 or the down arrow icon 266 may change the selected threshold sound level by a certain amount, such as a particular decibel amount. Thus, the user may select the corresponding arrow icon 264, 266 one or more times to select a desirable threshold sound level. Additionally or alternatively, the threshold sound level may be continuously changed while one of the arrow icons 264, 266 is held or pressed. As an example, the user may hold the up arrow icon 264 to continuously increase the selected threshold sound level. In any case, the arrow icons 264, 266 may be used to change the currently selected threshold sound level to a new selected threshold sound level, and the control system 150 may associate the selected threshold sound level with an operating condition and/or operate the HVAC system 148 according to the new selected threshold sound level.

While the illustrated embodiment shows the user interface 240 having the slider 252 and the arrow icons 264, 266 for adjusting and/or selecting a threshold sound level, other embodiments of the user interface 240 may have additional or alternative features configured to enable user selection and/or adjustment of a threshold sound level. For example, the user interface 240 may include other icons and/or physical buttons, such as dials, switches, knobs, and/or other adjusters that may be manipulated to adjust and/or select a threshold sound level. In another example, the user interface 240 may include a feature that enables the user to directly indicate a threshold sound level, such as a decibel amount, not to be exceeded during operation of the HVAC system 148. For example, a keyboard or numeric keypad may be displayed by the user interface 240 for a user to input a particular threshold sound level. In another example, the user interface 240 may enable the user to create a new operating condition, such as a new sound profile. That is, the user may create an additional operating condition that is associated with enabling and/or blocking operation of one or more components of the HVAC system 150 at various operating parameter values based on a designated operational sound level associated with the new operating condition. The sound profile created by the user may then be selectable via the user interface 240 to cause the control system 150 to operate the components of the HVAC system 148 accordingly, such as to maintain a total sound output of the HVAC system 148 to be below an operational sound level. Furthermore, the user interface 240 may enable the user to modify an existing sound profile. For instance, the user may adjust the operating parameters that are enabled or blocked for one of the existing sound profiles. In this way, the user interface 240 enables the user to customize the operation of the HVAC system 148 based on the selected threshold sound level.

In some embodiments, the user interface 240 may also present certain notifications, such as via the display 242. Such notifications may indicate certain implications associated with the selection of one of the sound profiles or threshold sound levels. For example, the notification may inform the user that reducing the threshold sound level may cause the HVAC system 148 to operate less efficiently, for example, by increasing energy consumption. The notifications may also include flags to indicate that a particular sound profile or threshold sound level is currently not achievable, which may indicate that maintenance or inspection of the HVAC system 148 should be performed. Indeed, the notification may provide the user with additional information for managing the operation of the HVAC system 148.

The illustrated user interface 240 additionally includes a test icon 268. The test icon 268 may be selected or actuated to temporarily operate the HVAC system 148 for a predetermined block of time based on a selected test sound profile or test threshold sound level. That is, the HVAC system 148 may transition from operating according to a first operating condition to operating according to a second operating condition for a period of time and then operating according to the first operating condition again after the period of time has elapsed. As an example, the control system 150 may currently be operating the HVAC system 148 based on the second sound profile associated with the second sound profile icon 246. Upon selection of the test icon 268 and the first sound profile icon 244, the control system 150 may pause operation of the HVAC system 148 in accordance with the second sound profile and instead, may initiate operation of the HVAC system 148 in accordance with the first sound profile associated with the first sound profile icon 244 for the predetermined block of time. The user may observe operation of the HVAC system 148 during the block of time, such as by observing the sound level output by the HVAC system 148, the conditioning capability of the HVAC system 148, and so forth, to determine whether the performance of the HVAC system 148 associated with the first sound profile is sufficient or acceptable to the user. Thus, at any point during the block of time or after the block of time, the user may select a desired sound profile icon accordingly, such as to change the HVAC system 148 from operating in accordance with the second sound profile to operating in accordance with the first sound profile even if the block of time associated with the test icon 268 function has elapsed. However, if no further user selection is received after the block of time has elapsed, the control system 150 may change from operating the HVAC system 148 in accordance with the first sound profile back to operating the HVAC system 148 in accordance with the second sound profile, which was implemented before actuating the test icon 268. Accordingly, the test icon 268 causes the HVAC system 148 to operate in accordance with a sound profile for a preset time interval to enable the user to determine whether such operation based on the test threshold sound level parameter of a test sound profile is acceptable and may be used for prolonged operation of the HVAC system 148.

The present disclosure may provide one or more technical effects useful in the operation of an HVAC system. As discussed above, the operation of the HVAC system is based on a selected threshold sound level. In particular, operation of components of the HVAC system is controlled such that a sound level output by the HVAC system during operation does not exceed the selected threshold sound level. For example, the HVAC system may be configured to operate in accordance with various operating conditions that are each associated with a respective operational sound level. As such, upon receiving a selection indicative of a threshold sound level, the HVAC system may operate components of the HVAC system at respective operating parameter values such that the components do not output sound levels at or above the threshold sound level. To this end, the operating conditions are associated with permissible operating parameters values of a component of the HVAC system. For example, the component may be a variable frequency compressor, and the operating parameter values include frequency ranges in which the variable frequency compressor may operate without exceeding the threshold sound level of the selected sound profile. In this way, the operation of the HVAC system may limit the generated sound level below the indicated or selected threshold sound level. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be noted that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, and/or air conditioning (HVAC) system, comprising:
a control system;
a storage of the control system that stores instructions and a set of operating conditions of the HVAC system, wherein one or more operating conditions of the set of operating conditions is associated with a respective operational sound level; and
processor circuitry of the control system, wherein the processor circuitry is configured to execute the instructions to receive an input indicative of a threshold sound level and operate the HVAC system according to an operating condition of the set of operating conditions based on an operational sound level of the operating condition being less than or equal to the threshold sound level, the operating condition comprises a plurality of operating parameter values of a component of the HVAC system, the plurality of operating parameter values comprises a first operating parameter value at which operation of the component is enabled, the plurality of operating parameter values comprises a second operating parameter value at which operation of the component is blocked, and the first operating parameter value is greater than the second operating parameter value.

2. The HVAC system of claim 1, wherein the component is a compressor, an outdoor fan, or both.

3. The HVAC system of claim 1, wherein the operational sound level associated with the operating condition is a cumulative operational sound level associated with the operation of the HVAC system.

4. The HVAC system of claim 1, wherein the storage is configured to store a plurality of sound profiles, the operating condition is associated with a first sound profile of the plurality of sound profiles, an additional operating condition is associated with a second sound profile of the plurality of sound profiles, and an additional operational sound level of the additional operating condition is different from the operational sound level of the operating condition.

5. The HVAC system of claim 4, wherein the processor circuitry is configured to execute the instructions to operate the HVAC system according to the first sound profile during a first scheduled time period and operate the HVAC system according to the second sound profile during a second scheduled time period different from the first scheduled time period.

6. The HVAC system of claim 1, wherein the control system comprises a user interface configured to display a plurality of sound profiles stored by the storage, and the input comprises a user selection of one of the plurality of sound profiles as the threshold sound level.

7. The HVAC system of claim 1, wherein the storage comprises a first memory of the control system and a second memory of the HVAC system.

8. The HVAC system of claim 1, wherein the second operating parameter value comprises an excluded compressor operating frequency that is associated with operation at a sound level above the threshold sound level.

9. The HVAC system of claim 1, wherein the second operating parameter value comprises an excluded compressor operating speed that is associated with operation at a sound level above the threshold sound level.

10. The HVAC system of claim 1, wherein the second operating parameter value comprises an excluded outdoor fan speed that is associated with operation at a sound level above the threshold sound level.

11. The HVAC system of claim 1, wherein the plurality of operating parameter values comprises a third operating parameter value at which operation of the component is enabled, the second operating parameter value is between the first operating parameter value and the third operating parameter value, and the processor circuitry is configured to execute the instructions to operate the component at the first operating parameter value and at the third operating parameter value and to skip operation of the component at the second operating parameter value according to the operating condition.

12. A non-transitory, computer-readable medium comprising executable instructions that, when executed by a processor, are configured to cause the processor to:
store a set of operating conditions of a heating, ventilation, and/or air conditioning (HVAC) system, wherein one or more operating conditions of the set of operating conditions is associated with a respective operational sound level, a particular operating condition of the set of operating conditions defines an available operating parameter value of a component of the HVAC system and an excluded operating parameter value of the component, and the excluded operating parameter value is less than the available operating parameter value;
receive an indication of a threshold sound level; and
select an operating condition of the set of operating conditions of the HVAC system, wherein an operational sound level of the operating condition is less than or equal to the threshold sound level.

13. The non-transitory, computer-readable medium of claim 12, wherein the operating condition comprises the particular operating condition, and the instructions, when executed by the processor, cause the processor to operate the component of the HVAC system at the available operating parameter value and block operation of the component at the excluded operating parameter value.

14. The non-transitory, computer-readable medium of claim 13, wherein the particular operating condition is a first operating condition defining the excluded operating parameter value of the component of the HVAC system, and the set of operating conditions comprises a second operating condition defining the same excluded operating parameter value of the component of the HVAC system.

15. The non-transitory, computer-readable medium of claim 13, wherein the particular operating condition is a first operating condition, the excluded operating parameter value is a first excluded operating parameter value of the component of the HVAC system, the set of operating conditions comprises a second operating condition defining a second excluded operating parameter value of the component of the HVAC system, and the first excluded operating parameter value is different than the second excluded operating parameter value.

16. The non-transitory, computer-readable medium of claim 15, wherein the second operating condition defines the first excluded operating parameter value of the component of the HVAC system.

17. The non-transitory, computer-readable medium of claim 12, wherein the operating condition defines a combination of available operating parameter values associated with components of the HVAC system, the combination of available operating parameter values is associated with a cumulative operational sound level, and the cumulative operational sound level is equal to or less than the threshold sound level.

18. A heating, ventilation, and/or air conditioning (HVAC) system, comprising:
processor circuitry; and
a memory comprising instructions executable by the processor circuitry to cause the processor circuitry to:
access a set of operating conditions of the HVAC system, wherein one or more operating conditions of the set of operating conditions is associated with a respective operational sound level;
receive an indication of a threshold sound level;
select an operating condition of the set of operating conditions based on the operational sound level of the operating condition being less than or equal to the threshold sound level, wherein the operating condition defines a first operating parameter value at which to enable operation of a component of the HVAC system and a second operating parameter value at which to block operation of the component, and the second operating parameter value is less than the first operating parameter value;
operate the component at the first operating parameter value according to the operating condition; and
block operation of the component at the second operating parameter value according to the operating condition.

19. The HVAC system of claim 18, wherein the operating condition defines a third operating parameter value at which to enable operation of the component of the HVAC system, the third operating parameter value is less than the second operating parameter value, and the instructions are executable by the processor circuitry to cause the processor circuitry to operate the component at the third operating parameter value according to the operating condition.

20. The HVAC system of claim 18, wherein the memory is configured to store a database table comprising the set of operating conditions, and the instructions are executable by the processor circuitry to cause the processor circuitry to reference the database table to access the set of operating conditions stored on the database table.

21. The HVAC system of claim 18, comprising a user interface communicatively coupled to the processor circuitry, wherein the user interface is configured to receive a user input as the indication of the threshold sound level.

22. The HVAC system of claim 21, wherein the user interface is configured to display a plurality of icons, the user input comprises a user selection of an icon of the plurality of icons, and the plurality of icons comprises a selectable sound profile, a slider, a selectable icon, or any combination thereof.

23. The HVAC system of claim 18, wherein the operating condition is a first operating condition, and the instructions are executable by the processor circuitry to cause the processor circuitry to:
  receive an additional indication of a test threshold sound level;
  select a second operating condition of the set of operating conditions based on the test threshold sound level, wherein an additional operational sound level associated with the second operating condition is less than or equal to the test threshold sound level;
  operate the HVAC system according to the second operating condition for a period of time; and
  operate the HVAC system according to the first operating condition after the period of time has elapsed.

24. The HVAC system of claim 18, wherein the operating condition comprises a plurality of operating parameter values at which to operate the component of the HVAC system, the plurality of operating parameter values comprises the first operating parameter value, the HVAC system comprises a sensor configured to detect a current sound level generated by the HVAC system, the sensor is communicatively coupled to the processor circuitry and is configured to transmit sensor data indicative of the current sound level, and the instructions are executable by the processor circuitry to cause the processor circuitry to adjust the plurality of operating parameter values based on the sensor data.

* * * * *